United States Patent

Sano

(10) Patent No.: US 12,031,627 B2
(45) Date of Patent: Jul. 9, 2024

(54) TRANSMISSION CONTROL DEVICE AND TRANSMISSION CONTROL METHOD

(71) Applicant: KAWASAKI MOTORS, LTD., Hyogo (JP)

(72) Inventor: Katsuya Sano, Kobe (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 2 days.

(21) Appl. No.: 18/147,135

(22) Filed: Dec. 28, 2022

(65) Prior Publication Data

US 2023/0204100 A1   Jun. 29, 2023

(30) Foreign Application Priority Data

Dec. 28, 2021   (JP) ................... 2021-213743

(51) Int. Cl.
*F16H 61/04*   (2006.01)
(52) U.S. Cl.
CPC . *F16H 61/0403* (2013.01); *F16H 2061/0474* (2013.01)
(58) Field of Classification Search
CPC ............ F16H 61/0403; F16H 2061/0474
See application file for complete search history.

(56) References Cited

U.S. PATENT DOCUMENTS

| | | | | |
|---|---|---|---|---|
| 5,213,186 A * | 5/1993 | Murata | ........... | F16H 61/143 477/169 |
| 5,498,217 A * | 3/1996 | Maruyama | ........... | B60W 10/11 477/181 |
| 5,562,571 A * | 10/1996 | Maruyama | ........... | B60W 30/1819 477/174 |
| 5,766,110 A * | 6/1998 | Kanno | ........... | F16D 48/08 477/80 |
| 10,876,583 B2 * | 12/2020 | Ryuzaki | ........... | F16D 48/06 |
| 2002/0077218 A1 * | 6/2002 | Segawa | ........... | F16H 61/143 477/176 |
| 2009/0270224 A1 | 10/2009 | Minami | | |
| 2019/0203783 A1 * | 7/2019 | Ryuzaki | ........... | F16D 48/06 |

FOREIGN PATENT DOCUMENTS

JP   2009-264519 A   11/2009

* cited by examiner

*Primary Examiner* — Ha Dinh Ho
(74) *Attorney, Agent, or Firm* — Procopio, Cory, Hargreaves & Savitch LLP

(57) ABSTRACT

There are provided a transmission control device and a transmission control method that controls a prime mover in a system including the prime mover and a gear transmission. A processing circuitry of the transmission control device executes a process including: determining whether to fall into a predetermined situation at a time of acquiring a shift command; when it is determined as being the predetermined situation, starting a separation control that adjusts an output of the prime mover such that a dog is separated from an abutment surface against which the dog abuts at the time of acquiring the shift command; and after the separation control is completed and before the dog at the first transmission gear position moves out of an accommodation space at the first transmission gear position, starting a synchronous control relating to the dog and transmission gears.

10 Claims, 7 Drawing Sheets

FIRST TRANSMISSION GEAR POSITION
STATE IN WHICH DOG ABUTS AGAINST FIRST SURFACE: θ = 20°

FIRST TRANSMISSION GEAR POSITION
STATE IN WHICH DOG ABUTS AGAINST SECOND SURFACE: θ = 0°

SEPARATION CONTROL

SYNCHRONOUS CONTROL

SECOND TRANSMISSION GEAR POSITION

TRANSMISSION CONTROL DEVICE AND TRANSMISSION CONTROL METHOD

CROSS-REFERENCE TO RELATED APPLICATIONS

This application is based on and claims priority under 35 USC 119 from Japanese Patent Application No. 2021-213743 filed on Dec. 28, 2021, the contents of which are incorporated herein by reference.

TECHNICAL FIELD

The present disclosure relates to a transmission control device and a transmission control method.

BACKGROUND ART

In the related art, in a dog clutch type gear transmission, at the time of shifting from a current transmission gear position to a next transmission gear position, a dog is disengaged from a gear pair having a certain reduction ratio, and then is moved along an input shaft or an output shaft of the gear transmission to be engaged with a gear pair having another reduction ratio. Thus, the gear pair for transmitting a driving force of a prime mover from the input shaft to the output shaft is switched (for example, JP2009-264519A).

In the dog clutch type gear transmission, it is desired that at the time of moving the dog, the dog is smoothly engaged with a transmission gear at the next transmission gear position.

SUMMARY OF INVENTION

Accordingly, the present disclosure provides a transmission control device and a transmission control method capable of implementing smooth engagement of a dog with a gear.

According to an illustrative aspect of the present disclosure, a transmission control device controls a prime mover in a system including the prime mover and a gear transmission. The transmission control device includes: a processing circuitry. The gear transmission includes an input shaft to which a driving force of the prime mover is transmitted, an output shaft, a plurality of dogs movable to the input shaft and the output shaft and each corresponding to a plurality of transmission gear positions, and a plurality of transmission gears each corresponding to the plurality of transmission gear positions and including an accommodation space into which the dog is capable of entering. The transmission gears include a first surface and a second surface by which the accommodation space is defined in a circumferential direction of the transmission gears, the first surface being a surface against which the dog abuts when torque is transmitted to the output shaft in a positive direction, and the second surface being a surface against which the dog abuts when torque is transmitted to the output shaft in a negative direction opposite to the positive direction. The transmission control device causes the processing circuitry to execute a process, the process including: determining whether to fall into a first situation at a time of acquiring a shift command for shifting from a first transmission gear position to a second transmission gear position, the first situation being a situation where the shift command is a shift-down command and the dog abuts against the first surface at the first transmission gear position or a situation where the shift command is a shift-up command and the dog abuts against the second surface at the first transmission gear position; when the processing circuitry is determined as being the first situation, starting a separation control that adjusts an output of the prime mover such that the dog is separated from an abutment surface against which the dog abuts at the time of acquiring the shift command, the abutment surface being the first surface or the second surface; and after the separation control is completed and before the dog at the first transmission gear position moves out of the accommodation space at the first transmission gear position, starting a synchronous control that brings one of a rotational speed of the dog at the second transmission gear position and a rotational speed of the transmission gears at the second transmission gear position close to the other.

According to another illustrative aspect of the present disclosure, a transmission control method controls a prime mover in a system including the prime mover and a gear transmission. The gear transmission includes an input shaft to which a driving force of the prime mover is transmitted, an output shaft, a plurality of dogs movable to the input shaft and the output shaft and each corresponding to a plurality of transmission gear positions, and a plurality of transmission gears each corresponding to the plurality of transmission gear positions and including an accommodation space into which the dog is capable of entering. The transmission gears include a first surface and a second surface by which the accommodation space is defined in a circumferential direction of the transmission gears, the first surface being a surface against which the dog abuts when torque is transmitted to the output shaft in a positive direction, and the second surface being a surface against which the dog abuts when torque is transmitted to the output shaft in a negative direction opposite to the positive direction. The transmission control method includes: determining whether to fall into a first situation at a time of acquiring a shift command for shifting from a first transmission gear position to a second transmission gear position, the first situation being a situation where the shift command is a shift-down command and the dog abuts against the first surface at the first transmission gear position or a situation where the shift command is a shift-up command and the dog abuts against the second surface at the first transmission gear position; when determining that the situation is the first situation, starting a separation control that adjusts an output of the prime mover such that the dog is separated from an abutment surface against which the dog abuts at the time of acquiring the shift command, the abutment surface being the first surface or the second surface; and after the separation control is completed and before the dog at the first transmission gear position moves out of the accommodation space at the first transmission gear position, starting a synchronous control that brings one of a rotational speed of the dog at the second transmission gear position and a rotational speed of the transmission gears at the second transmission gear position close to the other.

According to the present disclosure, it is possible to provide a transmission control device and a transmission control method capable of implementing smooth engagement of a dog with a gear.

DESCRIPTION OF EMBODIMENTS

Embodiments will be described hereinafter with reference to the accompanying drawings.

Figure 1:
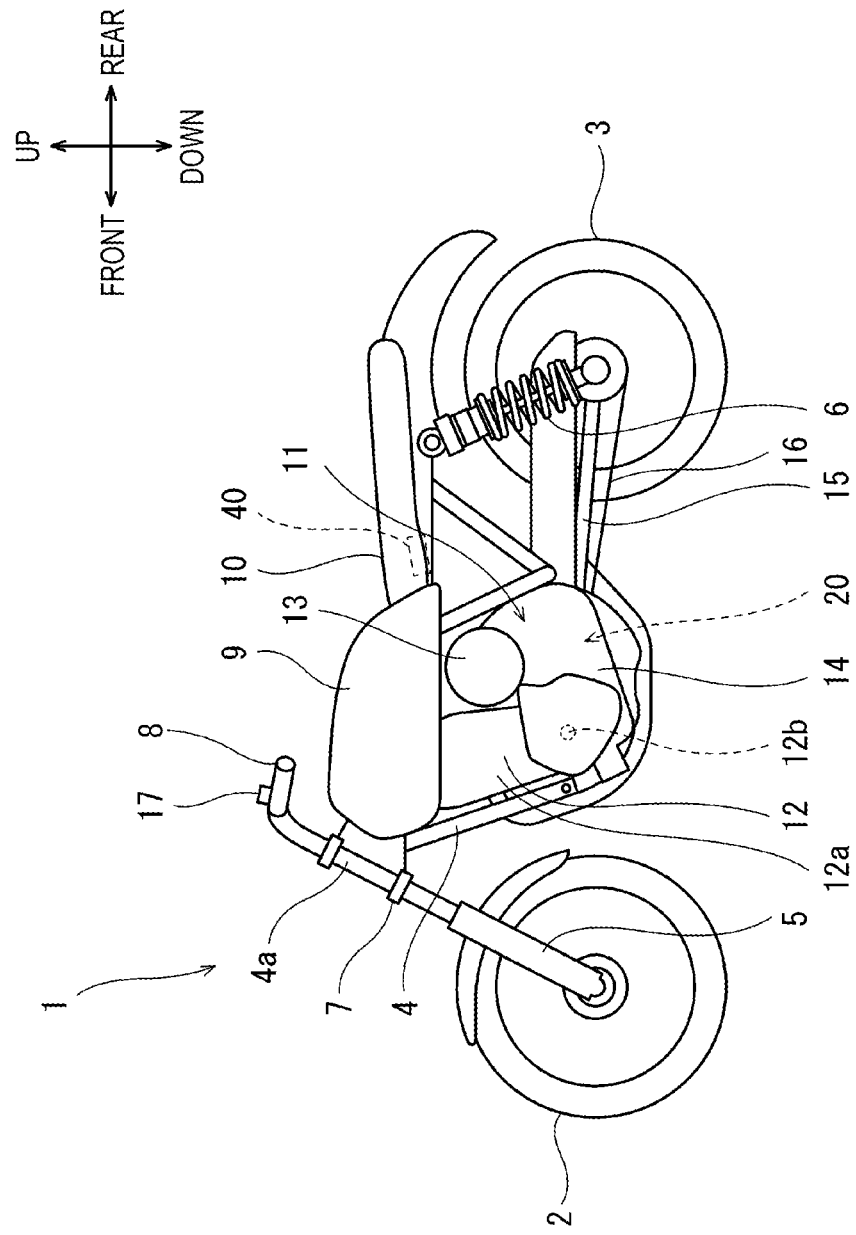
FIG. 1 is a left side view of a motorcycle including a transmission control device according to an embodiment.

FIG. 1 is a left side view of a motorcycle 1 including a transmission control device 40 according to an embodiment. The motorcycle 1 is an example of a straddle vehicle on which a rider straddles, and is a hybrid vehicle. Directions in the following description are based on a direction viewed from the rider of the motorcycle 1, a front-rear direction corresponds to a vehicle length direction, and a left-right direction corresponds to a vehicle width direction.

The motorcycle 1 includes a front wheel 2, a rear wheel 3, a vehicle body frame 4, a front suspension 5 that connects the front wheel 2 to a front portion of the vehicle body frame 4, and a rear suspension 6 that connects the rear wheel 3 to a rear portion of the vehicle body frame 4. The front suspension 5 is coupled to a bracket 7 disposed at an interval in an up-down direction. A steering shaft connected to the bracket 7 is supported by a head pipe 4a, which is a part of the vehicle body frame 4, so as to be angularly displaceable. The steering shaft is provided with a handle 8 that is gripped by hands of the rider. A fuel tank 9 is provided at a rear side of the handle 8, and a seat 10 on which the rider sits is provided at a rear side of the fuel tank 9.

A swing arm 15 that supports the rear wheel 3 and extends in the front-rear direction is supported on the vehicle body frame 4 so as to be angularly displaceable. In addition, a power unit 11 is mounted on the vehicle body frame 4 between the front wheel 2 and the rear wheel 3. The power unit 11 includes a first prime mover and a second prime mover which are two traveling drive sources. The first prime mover is an engine 12, which is an internal combustion engine. The second prime mover is a drive motor 13, which is an electric motor. Hereinafter, any prime mover of the first prime mover and the second prime mover, or the first prime mover and the second prime mover are collectively referred to as a "prime mover".

The engine 12 includes a cylinder 12a and a crankshaft 12b coupled to a piston in the cylinder. The crankshaft 12b of the engine 12 is accommodated in a crankcase 14. In addition, a gear transmission 20 is disposed at a rear side of the engine 12. The gear transmission 20 is accommodated in the crankcase 14. A shift switch 17 for changing a transmission gear position, which is a shift position of the gear transmission 20, is provided at a left grip of the handle 8. The transmission control device 40 is disposed below the seat 10. The transmission control device 40 controls the engine 12, the drive motor 13, and a clutch actuator 19 and a shift actuator 30, which will be described later.

Figure 2:
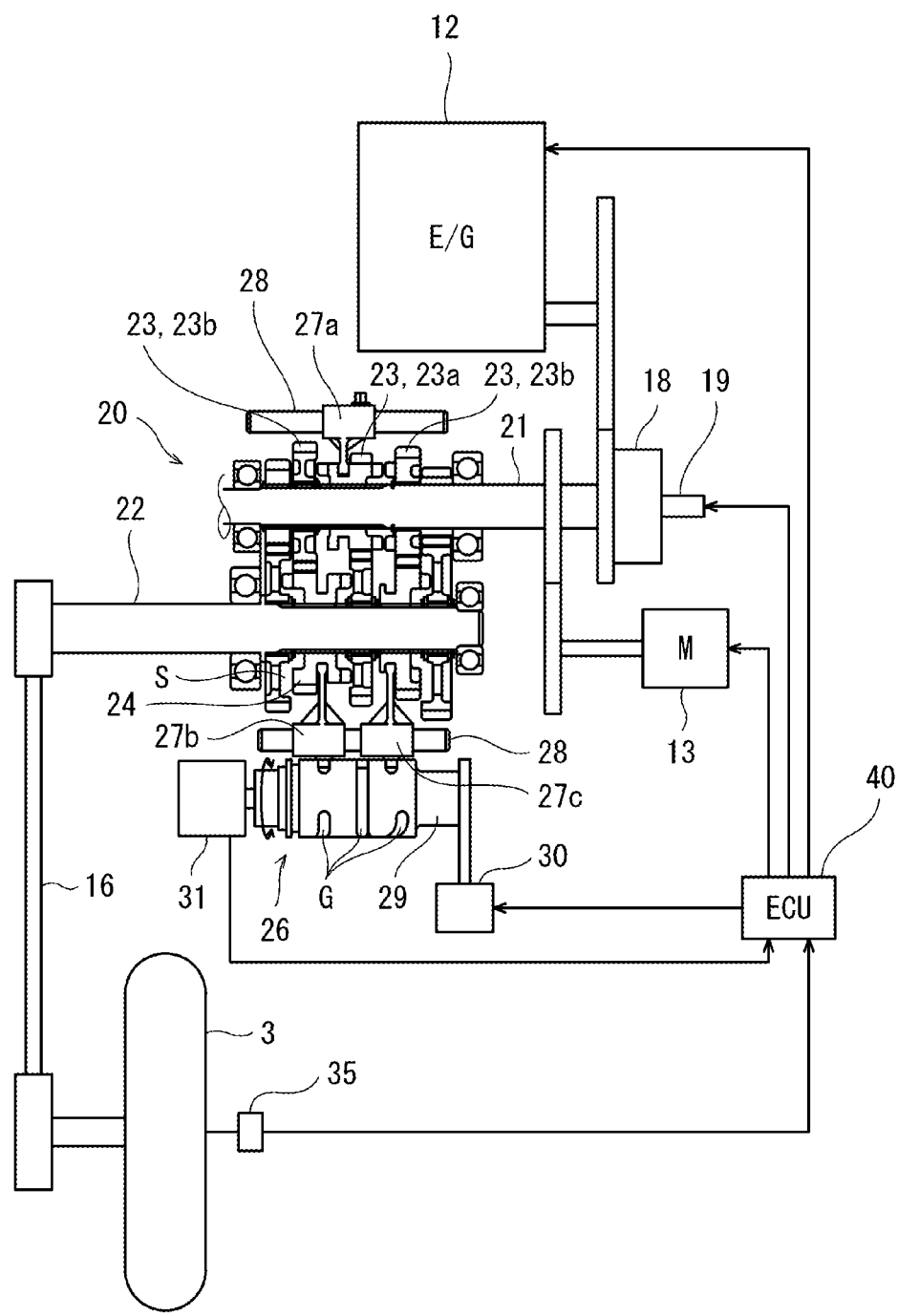
FIG. 2 is a schematic diagram of a power system of the motorcycle in FIG. 1.

FIG. 2 is a schematic diagram of a power system of the motorcycle 1 in FIG. 1. The gear transmission 20 includes an input shaft 21, an output shaft 22, and a plurality of transmission gear pairs 23.

A driving force of at least one of the first prime mover and the second prime mover can be transmitted to the input shaft 21. Specifically, a main clutch 18 is interposed in an engine power transmission path between the crankshaft 12b of the engine 12 and the input shaft 21 of the gear transmission 20. For example, the main clutch 18 is a multi-plate clutch. A rotational power of the crankshaft 12b of the engine 12 is input to the input shaft 21 via the main clutch 18. The main clutch 18 is driven by the clutch actuator 19 to disconnect or connect the engine power transmission path. In addition, a rotational power of a rotation shaft of the drive motor 13 is input to the input shaft 21. Power can be simultaneously transmitted to the input shaft 21 from both the engine 12, which is the first prime mover, and the drive motor 13, which is the second prime mover.

The output shaft 22 is disposed parallel to the input shaft 21. Hereinafter, a direction parallel to the input shaft 21 and the output shaft 22 is referred to as an "axial direction". The plurality of transmission gear pairs 23 are arranged in the axial direction. The plurality of transmission gear pairs 23 have different reduction ratios. The reduction ratio may also be referred to as a gear ratio or a transmission ratio. Each transmission gear pair 23 includes one transmission gear 23 provided coaxially with the input shaft 21 and one transmission gear 23 provided coaxially with the output shaft 22.

Of the two transmission gears 23 included in each transmission gear pair 23, one transmission gear 23 is a gear (hereinafter, referred to as a "co-rotation gear") 23a that rotates integrally with the input shaft 21 or the output shaft 22 that is coaxial with the one transmission gear 23. For example, the co-rotation gear 23a is assembled to the input shaft 21 or the output shaft 22 by spline fitting. Of the two transmission gears 23 included in each transmission gear pair 23, the other transmission gear 23 is a gear (hereinafter, referred to as an "idle gear") 23b that is rotatable relative to the input shaft 21 or the output shaft 22 that is coaxial with the other transmission gear 23.

The co-rotation gear 23a and the idle gear 23b of each transmission gear pair 23 are always engaged with each other. In the present embodiment, the co-rotation gears 23a and the idle gears 23b are alternately arranged in the axial direction on the input shaft 21. Similarly, the idle gears 23b and the co-rotation gears 23a are alternately arranged in the axial direction on the output shaft 22. In FIG. 2, in order to avoid complication, only some of the co-rotation gears and the idle gears are denoted by reference numerals, and the reference numerals of the other gears are omitted.

The gear transmission 20 is a dog clutch type transmission. The gear transmission 20 includes a plurality of dogs 24 corresponding to a plurality of transmission gear positions, respectively, and a shift mechanism 26.

The dogs 24 are movable in the axial direction with respect to the input shaft 21 and the output shaft 22 by the shift mechanism 26. One of the plurality of dogs 24 is moved in the axial direction by the shift mechanism 26, and is selectively engaged with one of the plurality of transmission gear pairs 23. Accordingly, one transmission gear pair 23 engaged with the dog 24 is brought into a state in which the driving force can be transmitted from the input shaft 21 to the output shaft 22. That is, the driving force transmitted to the input shaft 21 is transmitted to the output shaft 22 via the transmission gear pair 23 engaged with the dog 24. A rotational power of the output shaft 22 is transmitted to the rear wheel 3, which is a drive wheel, via an output transmission member 16. The output transmission member 16 is, for example, a chain, a belt, or the like.

The shift mechanism 26 includes shift forks 27a, 27b, and 27c, a support shaft 28, and a shift drum 29. The shift forks 27a, 27b, and 27c are slidably supported by the support shaft 28 provided parallel to the input shaft 21 and the output shaft 22. As will be described later, in the present embodiment, some of the co-rotation gears 23a are integrated with the dogs 24. One end portion of the shift fork 27a is connected to the co-rotation gear 23a that is externally mounted on the input shaft 21 and moves integrally with the dog 24. In addition, one end portions of the shift forks 27b and 27c are connected to the respective co-rotation gears 23a that are externally mounted on the output shaft 22 and move integrally with the dogs 24.

In addition, other end portions of the shift forks 27a, 27b, and 27c are fitted into respective guide grooves G of the shift drum 29. When the shift drum 29 rotates, the shift forks 27a, 27b, and 27c guided by the respective guide grooves G move the corresponding dogs 24 in the axial direction. The dog 24 enters an accommodation space S to be described later of the idle gear 23b to be engaged with the idle gear 23b with a play. In addition, the dog 24 moves out of the accommodation space S to be described later of the idle gear 23b to be disengaged from the idle gear 23b.

Figure 3:
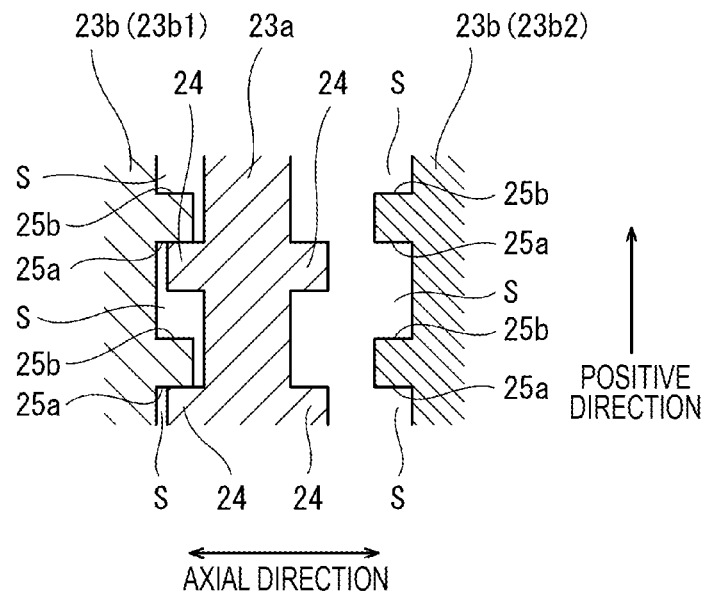
FIG. 3 is an enlarged schematic diagram showing an example of a state in which a dog at a first transmission gear position is engaged with a transmission gear at the first transmission gear position.
Figure 4:
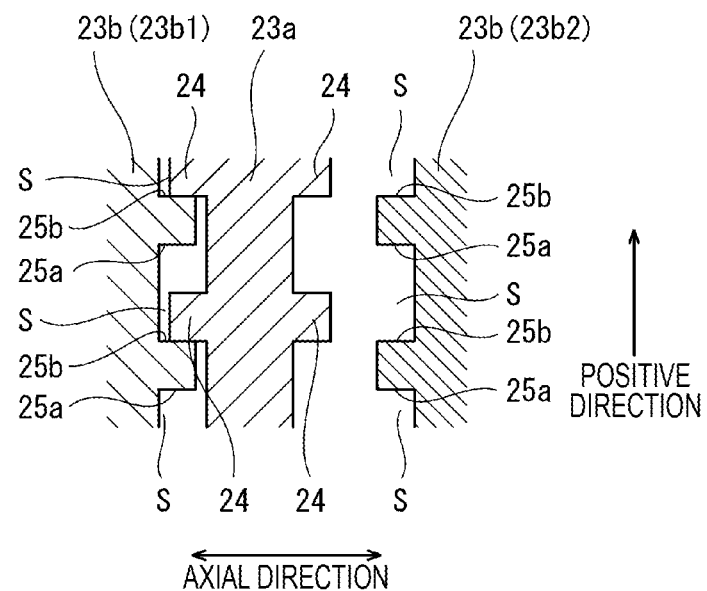
FIG. 4 is an enlarged schematic diagram showing another example of a state in which the dog at the first transmission gear position is engaged with the transmission gear at the first transmission gear position.

FIGS. 3 and 4 are enlarged views of some transmission gears 23 provided coaxially with the input shaft 21 as viewed in a direction orthogonal to the axial direction. FIGS. 3 and 4 show an example of an engagement state between the transmission gear 23 and the dog 24 at a certain transmission gear position. In the present description, for convenience, a current transmission gear position is referred to as a first transmission gear position, and of the transmission gear pair 23 corresponding to the first transmission gear position, the gear 23 with which the dog (which may also be referred to as a first dog) 24 corresponding to the first transmission gear position can be engaged is referred to as a first gear (or a current gear or a pre-transmission gear) 23b1. In addition, a next transmission gear position after the dog 24 shifts from the current transmission gear position based on a shift command is referred to as a second transmission gear position, and of the transmission gear pair 23 corresponding to the second transmission gear position, the gear 23 with which the dog (which may also be referred to as a second dog) 24 corresponding to the second transmission gear position can be engaged is referred to as a second gear (or a next gear or a post-transmission gear) 23b2.

As shown in FIG. 3, in the present embodiment, some co-rotation gears 23a are integrated with the dogs 24, and are movable in the axial direction with respect to the input shaft 21 or the output shaft 22 together with the dogs 24. Specifically, the dogs 24 are provided so as to protrude in the axial direction from an axial end surface of the co-rotation gear 23a. The dogs 24 are formed by a plurality of projections arranged at predetermined intervals in a circumferential direction of the co-rotation gear 23a on the end surface of the co-rotation gear 23a.

The dog 24 and the idle gear 23b axially opposed to the co-rotation gear 23a include the accommodation space S into which the dog 24 can enter. The accommodation space S is opened on a side in the axial direction where the dog 24 is disposed such that the moving dog 24 can enter the accommodation space S. In the present embodiment, the accommodation space S is formed by a plurality of projections arranged at predetermined intervals in a circumferential direction of the idle gear 23b on an axial end surface of the idle gear 23b. That is, the accommodation space S is a space formed between the projections adjacent to each other in the circumferential direction of the idle gear 23b on the end surface of the idle gear 23b. The accommodation space S may be a hole formed in the axial end surface of the idle gear 23b. That is, the accommodation space S may be opened or may not be opened in a radial direction of the idle gear 23b.

As shown in FIG. 3, the transmission gear 23 including the accommodation space S includes a first surface 25a and a second surface 25b which define the accommodation space S in a circumferential direction of the transmission gear 23. The first surface 25a is a surface against which the dog 24 that entered the accommodation space S abuts at least when torque is transmitted to the output shaft 22 in a predetermined positive direction. The second surface 25b is a surface against which the dog 24 that entered the accommodation space S abuts at least when torque is transmitted to the output shaft 22 in a negative direction opposite to the positive direction.

In FIG. 3 and FIGS. 4, 7, and 8 to be described later, the axial direction and the positive direction are indicated by arrows. In the present description, the positive direction means a generation direction of the torque of the input shaft 21 and the output shaft 22 in a direction in which the output shaft 22 is accelerated when a vehicle (the motorcycle 1 in the present example) moves forward. That is, the first surface 25a is a surface against which the dog 24 that entered the accommodation space S abuts at least when rotation of the output shaft 22 is accelerated, and the second surface 25b is a surface against which the dog 24 that entered the accommodation space S abuts at least when the rotation of the output shaft 22 is decelerated. In particular, in the present example, the first surface 25a is a surface against which the dog 24 that entered the accommodation space S abuts while the vehicle (the motorcycle 1 in the present example) is accelerating forward, and the second surface 25b is a surface against which the dog 24 that entered the accommodation space S abuts while the vehicle (the motorcycle 1 in the present example) is decelerating. During constant speed movement of the vehicle, the dog 24 may abut against the first surface 25a or the second surface 25b.

As shown in FIG. 3, the dog 24 abuts against the first surface 25a of the first gear 23b1, such that the driving force transmitted from the prime mover to the input shaft 21 is transmitted from the dog 24 to the first gear 23b1, and is transmitted to the output shaft 22 via the co-rotation gear 23a meshing with the first gear 23b1.

When a rotational speed of the dog 24 decreases with respect to a rotational speed of the first gear 23b1 from the state shown in FIG. 3, the dog 24 separates from the first surface 25a and abuts against the second surface 25b. FIG. 4 shows a state in which the dog 24 abuts against the second surface 25b of the first gear 23b1. The dog 24 abuts against the second surface 25b of the first gear 23b1, such that the torque in the negative direction is transmitted from the dog 24 to the first gear 23b1, and is transmitted to the output shaft 22 via the co-rotation gear 23a meshing with the first gear 23b1.

Figure 5:
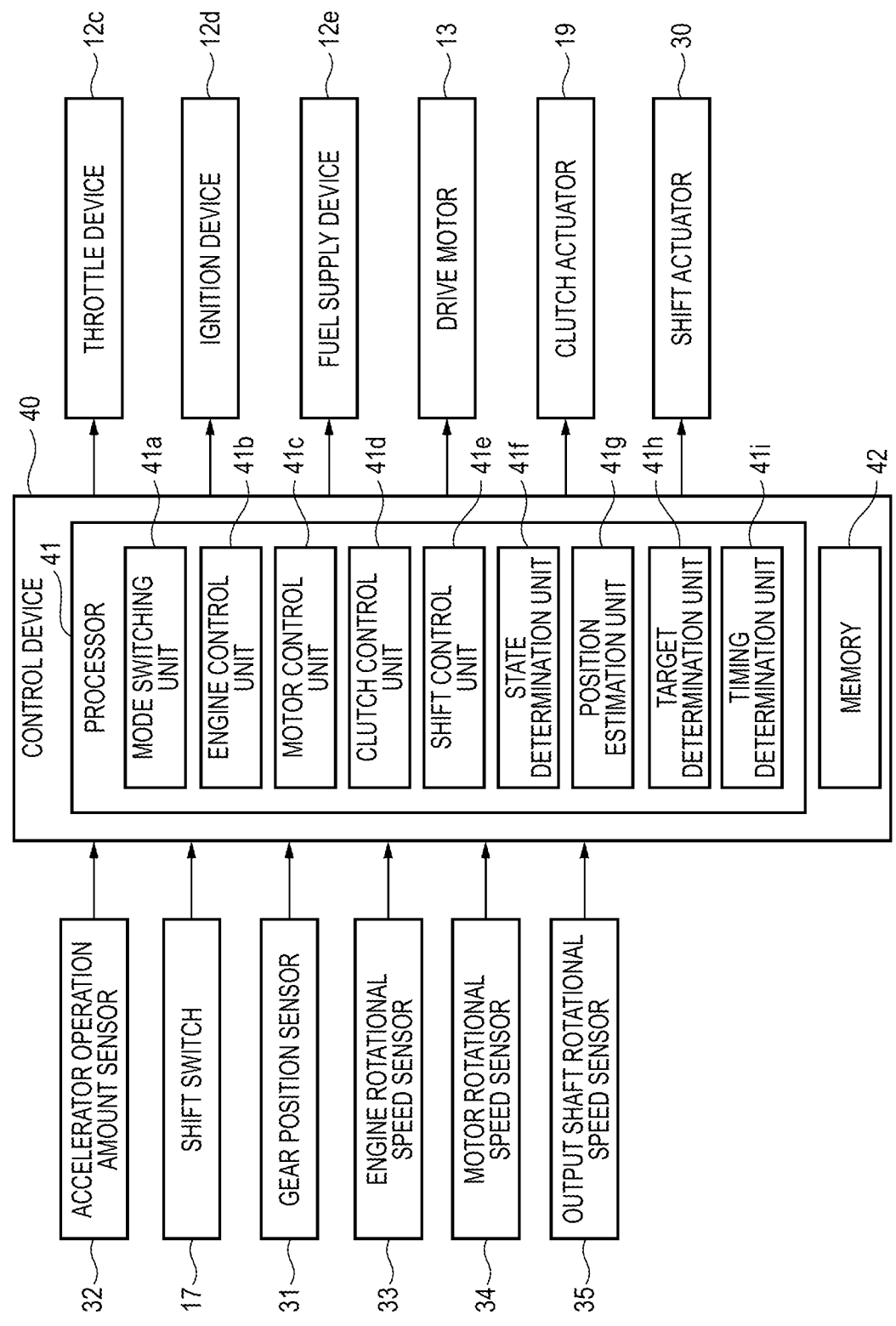
FIG. 5 is a block diagram showing the transmission control device and input and output thereof.

FIG. 5 is a block diagram showing the transmission control device 40 and input and output thereof. The transmission control device 40 controls the engine 12, the drive motor 13, the clutch actuator 19, and the shift actuator 30. As shown in FIG. 5, the transmission control device 40 is input with detection signals from an accelerator operation amount sensor 32, the shift switch 17, a gear position sensor 31, an engine rotational speed sensor 33, a motor rotational speed sensor 34, and an output shaft rotational speed sensor 35. The transmission control device 40 outputs control signals to a throttle device 12c, an ignition device 12d, a fuel supply device 12e, the drive motor 13, the clutch actuator 19, and the shift actuator 30.

The accelerator operation amount sensor 32 detects an accelerator operation amount (an acceleration request amount) of the rider.

The shift switch 17 sends the shift command for changing the transmission gear position of the gear transmission 20 to the transmission control device 40 in accordance with a manual operation by the rider. For example, the shift command is a shift-up command or a shift-down command. The shift-up command is a command for increasing the transmission gear position of the gear transmission 20. More specifically, the shift-up command is a command for increasing the reduction ratio of the output shaft 22 with respect to the input shaft 21. The shift-down command is a command for decreasing the transmission gear position of the gear transmission 20. More specifically, the shift-down command is a command for reducing the reduction ratio of the output shaft 22 with respect to the input shaft 21.

The gear position sensor 31 detects a rotation angle of the shift drum 29. Based on the rotation angle of the shift drum 29, it is possible to detect which one of the plurality of transmission gear pairs 23 of the gear transmission 20 is in a selected state, that is, which transmission gear position is in.

The engine rotational speed sensor 33 detects a rotational speed of an output shaft of the engine 12 (hereinafter, also referred to as an "engine rotational speed"). The motor rotational speed sensor 34 detects a rotational speed of an output shaft of the drive motor 13 (hereinafter, also referred to as a "motor rotational speed").

The output shaft rotational speed sensor 35 detects a rotational speed of the output shaft 22. The output shaft rotational speed sensor 35 may be provided on the output shaft 22 to directly detect the rotational speed of the output shaft 22. Alternatively, the output shaft rotational speed sensor 35 may indirectly detect the rotational speed of the output shaft 22 by detecting another parameter. For example, the output shaft rotational speed sensor 35 may be a wheel rotational speed sensor that detects a rotational speed of the rear wheel 3, which is a drive wheel (see FIG. 2).

The throttle device 12c adjusts an intake air amount of the engine 12. For example, the throttle device 12c is an electronically controlled throttle device that opens and closes a throttle valve by a motor. The ignition device 12d ignites an air-fuel mixture in a combustion chamber of the engine 12. The ignition device 12d is, for example, an ignition plug. The fuel supply device 12e supplies fuel to the engine 12.

The shift actuator 30 generates power for moving the dog 24. Specifically, the shift actuator 30 is controlled by the transmission control device 40 to rotationally drive the shift drum 29 of the shift mechanism 26. The transmission control device 40 controls the shift actuator 30 in accordance with an operation on the shift switch 17 by the rider. The shift actuator 30 is, for example, an electric motor.

The transmission control device 40 includes one or more processors 41 on a hardware surface. Each processor 41 includes a calculation device, a volatile memory, and a nonvolatile memory. The processor 41 is an example of a processing circuit, which may be referred to as a processing circuitry. The processor 41 performs calculation processing by the calculation device using the volatile memory in accordance with a program stored in the nonvolatile memory, and outputs a control signal corresponding to the detection signal input to the transmission control device 40. The transmission control device 40 includes, on a software surface, a mode switching unit 41a, an engine control unit 41b, a motor control unit 41c, a clutch control unit 41d, a shift control unit 41e, a situation determination unit 41f, a position estimation unit 41g, a target determination unit 41h, and a timing determination unit 41i. In FIG. 5, the one or more processors 41 are shown as one block, and functional blocks 41a, 41b, 41c, 41d, 41e, 41f, 41g, 41h, and 41i are collectively shown therein. In addition, the transmission control device 40 includes a memory 42. The memory 42 includes a volatile memory and a nonvolatile memory.

The mode switching unit 41a selects one mode from a plurality of traveling modes including an EGV mode, an EV mode, and an HEV mode.

The EGV mode is a mode in which the engine 12 is driven without driving the drive motor 13, and the rear wheel 3, which is a drive wheel, is driven by the rotational power of only the engine 12. In the EGV mode, the main clutch 18 is brought into a connection state by the clutch actuator 19 such that the rotational power of the engine 12 is transmitted to the rear wheel 3, which is a drive wheel, via the gear transmission 20.

The EV mode is a mode in which the engine 12 is stopped and the rear wheel 3, which is a drive wheel, is driven by the power generated by the drive motor 13. In the EV mode, the main clutch 18 is brought into a disconnection state by the clutch actuator 19 such that the engine 12 does not become resistant when the drive motor 13 is driven.

The HEV mode is a mode in which the rear wheel 3, which is a drive wheel, is driven by the power generated by the drive motor 13 and the engine 12. In the HEV mode, the main clutch 18 is brought into the connection state by the clutch actuator 19 such that the rotational power of the engine 12 is transmitted to the rear wheel 3 via the gear transmission 20.

The engine control unit 41b controls the throttle device 12c, the ignition device (the ignition plug) 12d, and the fuel supply device 12e to adjust an output of the engine 12. For example, the engine control unit 41b performs torque control such that output torque of the engine 12 becomes a value corresponding to the accelerator operation amount of the rider. The motor control unit 41c controls the drive motor 13 to adjust an output of the drive motor 13. For example, the motor control unit 41c performs torque control such that output torque of the drive motor 13 becomes a value corresponding to the accelerator operation amount of the rider. The engine control unit 41b and the motor control unit 41c perform control according to the traveling mode selected by the mode switching unit 41a.

The clutch control unit 41d controls the clutch actuator 19 to switch the state of the main clutch 18. For example, the clutch control unit 41d brings the main clutch 18 into the disconnection state when the EV mode is selected by the mode switching unit 41a, and brings the main clutch 18 into the connection state when the EGV mode or the HEV mode is selected by the mode switching unit 41a.

The shift control unit 41e, the situation determination unit 41f, the position estimation unit 41g, the target determination unit 41h, and the timing determination unit 41i relate to transmission processing executed when the shift command is generated, that is, when the shift command is received from the shift switch 17. The shift control unit 41e controls the shift actuator 30 in accordance with the acquired shift command. The situation determination unit 41f determines a situation when the shift command is acquired. The position estimation unit 41g estimates an angular position θ of the dog 24 at the first transmission gear position with respect to the accommodation space S at the first transmission gear position. The target determination unit 41h determines a target engine rotational speed, a target motor rotational speed, and a target drum angle at the time of shifting the dog 24. The timing determination unit 41i determines a timing at which the synchronous control to be described later is started, and a timing at which the control for moving the dog 24 is started.

<Transmission Processing>

Figure 6:
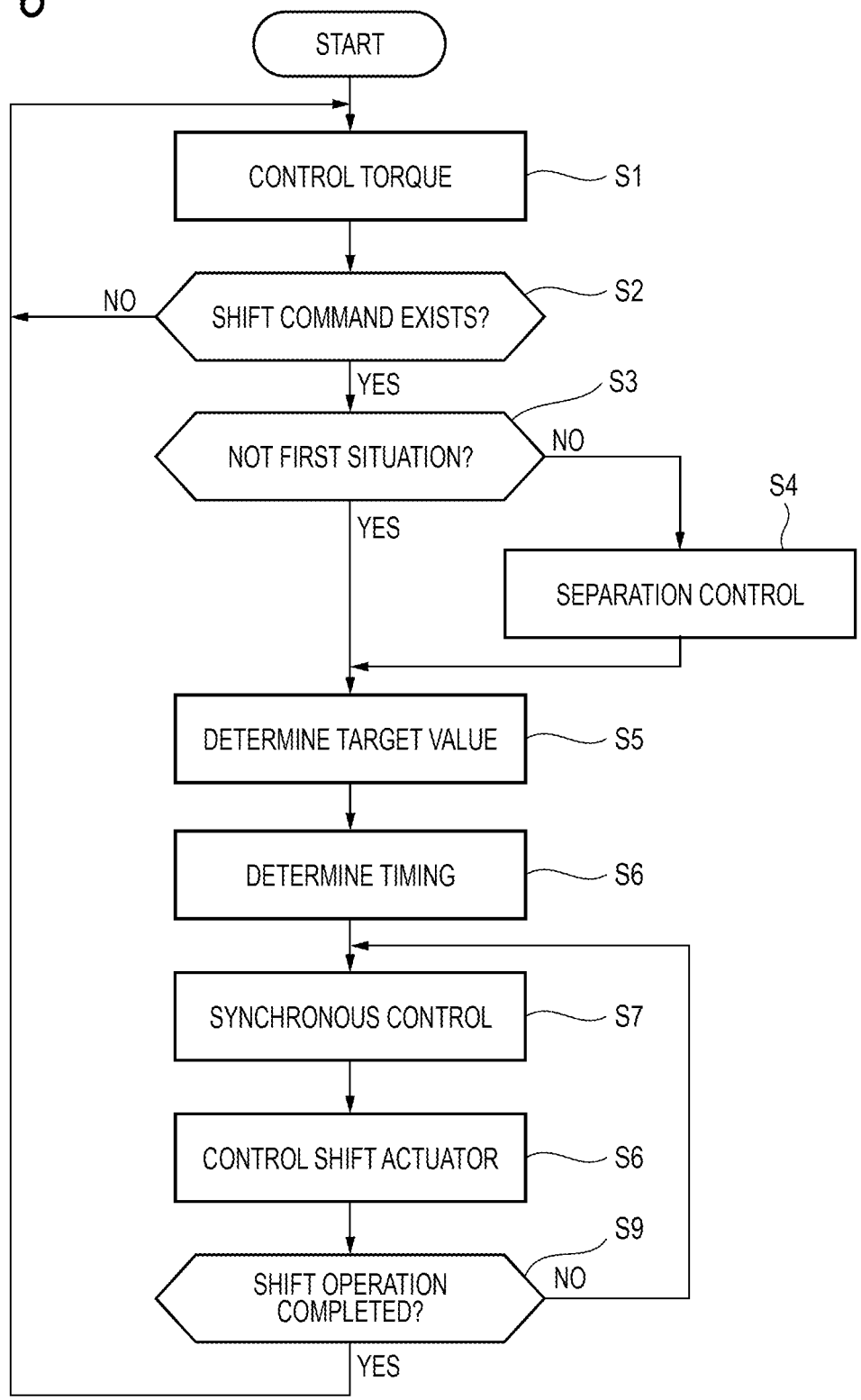
FIG. 6 is a flowchart showing a flow of control by the transmission control device during traveling of the motorcycle in FIG. 1.
Figure 7:
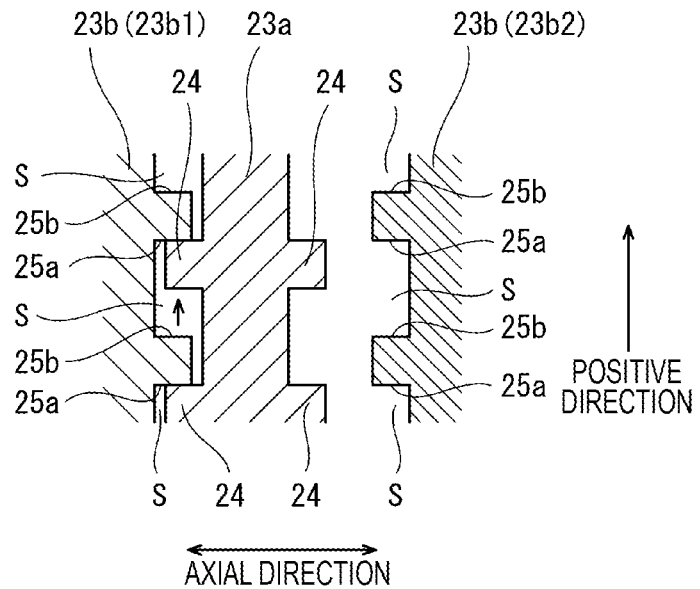
FIG. 7 is an enlarged schematic diagram of the dog and the transmission gear for describing an example of separation control.
Figure 8:
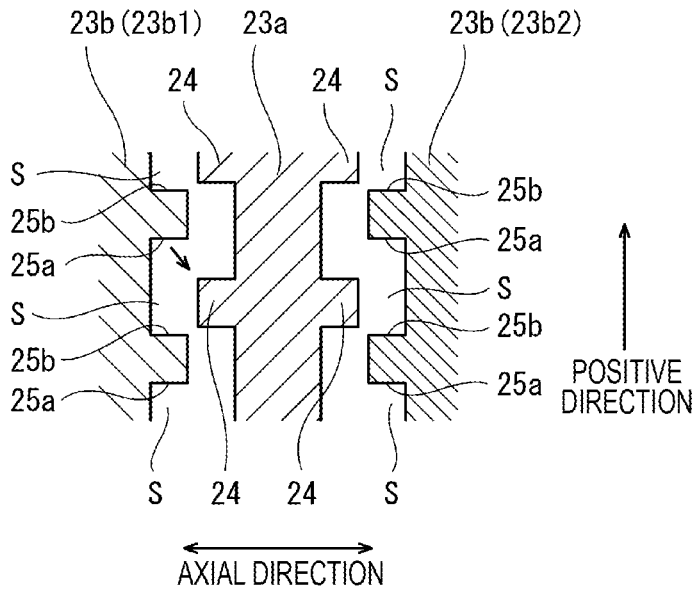
FIG. 8 is an enlarged schematic diagram of the dog and the transmission gear for describing an example of synchronous control.
Figure 9:
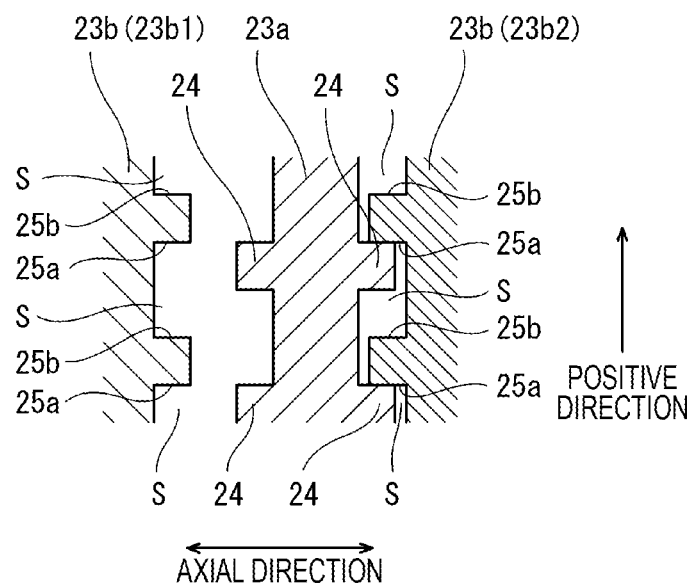
FIG. 9 is an enlarged schematic diagram showing an example of a state in which a dog at a second transmission gear position is engaged with a transmission gear at the second transmission gear position.

An example of the transmission processing will be described with reference to FIG. 6. FIG. 6 is a flowchart showing a flow of control by the transmission control device 40 during traveling of the motorcycle 1. The transmission processing will be described with reference to FIGS. 7 to 9 as appropriate. FIG. 7 is an enlarged schematic diagram of the dog and the transmission gear for describing an example of the separation control to be described later. FIG. 8 is an enlarged schematic diagram of the dog and the transmission gear for describing an example of the synchronous control to be described later. FIG. 9 is an enlarged schematic diagram showing an example of a state in which the dog at the second transmission gear position is engaged with the transmission gear at the second transmission gear position.

During the traveling of the motorcycle 1, at least one of the engine control unit 41b and the motor control unit 41c basically perform the torque control described above (step S1).

For example, in the EGV mode, the processor 40 determines an engine torque command value in accordance with the accelerator operation amount of the rider or the like, and the engine control unit 41b controls the throttle device 12c and the like based on the engine torque command value. For example, in the EV mode, the processor 40 determines a motor torque command value in accordance with the accelerator operation amount of the rider or the like, and the motor control unit 4 controls the drive motor 13 based on the motor torque command value. For example, in the HEV mode, the processor 40 determines the engine torque command value and the motor torque command value in accordance with the accelerator operation amount of the rider and the like, the engine control unit 41b controls the throttle device 12c and the like based on the engine torque command value, and the motor control unit 41c controls the drive motor 13 based on the motor torque command value.

During the torque control, the situation determination unit 41f determines whether a shift command for shifting from the first transmission gear position to the second transmission gear position (that is, a shift-up command or a shift-down command) exists (step S2). When it is determined that no shift command exists (step S2: No), the torque control by at least one of the engine control unit 41b and the motor control unit 41c is continued.

(Determination on Situation)

When it is determined that a shift command exists (step S2: Yes), the situation determination unit 41f determines that a situation when the shift command is acquired is the predetermined first situation. The first situation is the following situation (a) or (b).

(a) A situation in which the shift command is a shift-down command, and the dog 24 abuts against the first surface 25a at the first transmission gear position.

(b) A situation in which the shift command is a shift-up command, and the dog 24 abuts against the second surface 25b at the first transmission gear position.

The situation determination unit 41f determines whether the dog 24 abuts against the first surface 25a, the second surface 25b, or neither the first surface 25a nor the second surface 25b, in accordance with the angular position θ of the dog 24 estimated by the position estimation unit 41g.

(Estimation on Position of Dog)

Here, an example of a method for estimating the angular position θ of the dog 24 by the position estimation unit 41g will be described. The position estimation unit 41g estimates the angular position θ of the dog 24 with respect to the accommodation space S of the first gear 23b1.

The angular position θ of the dog 24 is represented by a displacement angle of the dog 24 from a reference position of the dog 24, the reference position being a position of the dog 24 when being positioned at a predetermined position in the accommodation space S. In the present embodiment, the position of the dog 24 when the dog 24 abuts against the second surface 25b of the first gear 23b1 is set as the reference position, and the angular position θ of the dog 24 is set to 0° (see FIG. 4). In addition, the dog 24 is angularly displaced by 20° from the reference position in the accommodation space S, such that the dog 24 abuts against the first surface 25a. Therefore, the angular position θ of the dog 24 when the dog 24 abuts against the first surface 25a of the first gear 23b1 is set to 20° (see FIG. 3).

For example, as shown in FIG. 3, it is considered that the first transmission gear position is a state in which the dog 24 that rotates integrally with the co-rotation gear 23a provided coaxially with the input shaft 21 is engaged with the first gear 23b1, which is an idle gear provided coaxially with the input shaft 21. In this case, of the dog 24 and the first gear 23b1 that are engaged with each other at the first transmission gear position, the dog 24 is on an input side in the power transmission path from the prime mover to the output shaft 22 via the input shaft 21, and the first gear 23b1 is on an output side in the power transmission path. An angular acceleration α[rad/s2] of the dog 24 on the input side of the power transmission path is obtained by the following equation (1).

[Equation 1]

$$\alpha = T/J \qquad (1)$$

Here, T[N·m2] in the above equation (1) is a value obtained by subtracting a total T2 of a resistance force from a total T1 of the driving force of the prime mover. Hereinafter, T is referred to as output torque. For example, in the EGV mode, the total value T1 of the driving force is the driving force of the engine 12. For example, in the EV mode, the total value T1 of the driving force is the driving force of the drive motor 13. For example, in the HEV mode, the total value T1 of the driving force is a total of the driving force of the engine 12 and the driving force of the drive motor 13.

In addition, the resistance force corresponds to a mechanical loss caused by the rotation of the plurality of rotary bodies that are rotated substantially without a play by the driving force of the prime mover. For example, in the EGV mode, the total value T2 of the resistance force includes, for example, a resistance force corresponding to a mechanical loss in the engine power transmission path. In the EGV mode, when the rotary body in the motor power transmission path from the drive motor 13 to the input shaft 21 also rotates with the rotation of the input shaft 21, the total value T2 of the resistance force further includes a resistance force corresponding to a mechanical loss in the motor power transmission path. For example, in the EV mode, the total value T2 of the resistance force includes, for example, a resistance force corresponding to a mechanical loss in the motor power transmission path. For example, in the HEV mode, the total value T2 of the resistance force includes a resistance force corresponding to a mechanical loss in the engine power transmission path and a resistance force corresponding to a mechanical loss in the motor power transmission path.

In the present embodiment, the engine torque command value and the motor torque command value are used to calculate the output torque T of the prime mover. For example, the torque indicated by the engine torque command value can be set as the driving force of the engine 12, and the torque indicated by the motor torque command value can be set as the driving force of the drive motor 13. In addition, for example, information indicating a correspondence relation between the torque command value for each prime mover and the resistance force (in other words, the mechanical loss) may be stored in advance in the memory 42, and the resistance force can be calculated using the torque command value and the correspondence relation stored in the memory 42. Information indicating a correspondence relation corresponding to each mode may be stored in the memory 42. Since the angular position θ of the dog 24 can be calculated from the torque command value, a sensor for calculating the angular position θ of the dog 24 can be reduced. The method for acquiring the driving force is not limited thereto. For example, the driving force of the engine may be calculated from the engine rotational speed, a throttle opening (or the accelerator operation amount), and the like using a torque map in advance.

In addition, J[Kg·m2] in the above equation (1) is a total value of inertia of the plurality of rotary bodies that are rotated substantially without a play by the output torque of the prime mover. In other words, the total inertia value J is the total of the inertia of the plurality of rotary bodies that are rotated by the output torque from the prime mover even when the gear transmission 20 is in a state in which none of the transmission gear pairs 23 is engaged with the dog 24 (a non-engagement state). For example, in the present embodiment, the total inertia value J includes inertia of the input shaft 21, inertia of some co-rotation gears 23a coaxial with the input shaft 21, inertia of some idle gears 23b coaxial with the output shaft 22 and meshing with the co-rotation gears 23a, respectively, and inertia of the dogs 24 provided in the co-rotation gears 23a coaxial with the input shaft 21.

For example, in the EGV mode, J further includes inertia of each rotary body (for example, the output shaft of the engine 12) in the engine power transmission path. In the EGV mode, when the rotary body in the motor power transmission path also rotates with the rotation of the input shaft 21, J further includes inertia of each rotary body (for example, the output shaft of the drive motor 13) in the motor power transmission path. In addition, for example, in the EV mode, J also includes inertia of each rotary body (for example, the output shaft of the drive motor 13) in the motor power transmission path. In addition, for example, in the HEV mode, the inertia of each rotary body (for example, the output shaft of the engine 12) in the engine power transmission path and the inertia of each rotary body (for example, the output shaft of the drive motor 13) in the motor power transmission path are included.

In addition, J may not include the inertia of the output shaft 22, the inertia of some co-rotation gears 23a coaxial with the output shaft 22, the inertia of some idle gears 23b coaxial with the output shaft 22 and meshing with the co-rotation gears 23a, respectively, and the inertia of the dogs 24 provided in the co-rotation gears 23a coaxial with the output shaft 22.

In addition, in the present embodiment, a time from acquisition of the shift command in the transmission processing to completion of the shift operation is executed, for example, in an extremely short time as compared with a time in which a speed change occurs in the rear wheel 3. Therefore, while the torque T is applied to the dog 24, the position estimation unit 41g estimates the angular position θ of the dog 24 on the assumption that the first gear 23b1 and the rear wheel 3 on the output side of the power transmission path have a constant speed. That is, the angular acceleration of the first gear 23b1 on the output side is set to 0. Therefore, the position estimation unit 41g estimates the angular position θ of the dog 24 with respect to the first gear 23b1 by second-order integration of the angular acceleration α calculated from the equation (1) as shown in the following equation (2).

[Equation 2]

$$\theta = \iint \alpha dt^2 \qquad (2)$$

At the first transmission gear position, a movement range of the dog 24 at the first transmission gear position with respect to the first gear 23b1 is limited to the accommodation space S of the first gear 23b1. In other words, the angular position θ of the dog 24 is limited between a predetermined lower limit value (θ=0°) in the present example) and an upper limit value (θ=20°) in the present example). Therefore, the position estimation unit 41g estimates that the angular position θ of the dog 24 is at the lower limit value when the angular position obtained by integrating an angular displacement amount falls below the lower limit value, and estimates that the angular position θ of the dog 24 is at the upper limit value when the angular position obtained by integrating the angular displacement amount exceeds the upper limit value.

In this way, in the present embodiment, the position estimation unit 41g calculates the angular position of the dog 24 based on the total T of the torque output from the prime mover and the total J of the inertia of the rotary bodies rotating together with the input shaft 21. For example, when the angular position θ estimated by the position estimation unit 41g is 0°, the situation determination unit 41f determines that the dog 24 abuts against the second surface 25b at the first transmission gear position. For example, when the angular position θ estimated by the position estimation unit 41g is 20°, the situation determination unit 41f determines that the dog 24 abuts against the first surface 25a at the first transmission gear position.

The estimation on the angular position θ of the dog 24 by the position estimation unit 41g can be always executed during the traveling of the motorcycle 1 regardless of whether the transmission control device 40 acquired the shift command. Of the dog 24 and the first gear 23b1 that are engaged with each other at the first transmission gear position, when the first gear 23b1 is on the input side of the power transmission path, the angular acceleration α[rad/s2] of the first gear 23b1 is obtained by the above equation (1).

(Separation Control)

In step S3, when the situation determination unit 41f determines that the situation when the shift command is acquired is the first situation (step S3: No), the separation control is started (step S4). The separation control is control for adjusting the output of the prime mover such that the dog 24 separates from the first surface 25a or the second surface 25b against which the dog 24 abuts when the shift command is acquired (see FIG. 7). Hereinafter, the first surface 25a or the second surface 25b against which the dog 24 abuts when the shift command is acquired will be referred to as an abutment surface, and a surface, which is a side that is not the abutment surface, of the first surface 25a or the second surface 25b will be referred to as an opposite surface.

In step S4, at least one of the engine control unit 41b and the motor control unit 41c performs control for adjusting the output such that the dog 24 is separated from the abutment surface when the shift command is acquired. The separation control is executed in order to avoid inhibition in synchronous control to be described later due to abutment between the dog 24 and the abutment surface (see an arrow in the accommodation space S in FIG. 8).

In step S3, when the situation determination unit 41f determines that the situation when the shift command is acquired is not the first situation (step S3: Yes), the separation control is omitted. The reason is that when the situation is not the first situation, the synchronous control to be described later is not inhibited by the dog 24 and the abutment surface abutting with each other.

For example, in step S3, when the situation determination unit 41f determines that the situation when the shift command is acquired is the second situation different from the first situation, the separation control is omitted. The second situation is a situation other than the situation (a) or (b), which is the first situation. For example, the second situation includes the following situation (c) or (d).

(c) A situation in which the shift command is a shift-up command, and the dog 24 abuts against the first surface 25a at the first transmission gear position.

(d) A situation in which the shift command is a shift-down command, and the dog 24 abuts against the second surface 25b at the first transmission gear position.

(Determination on Target Value)

When it is determined in step S3 that the situation is not the first situation, or after the separation control in step S4 is executed, the target determination unit 41h determines various target values (step S5). Specifically, the target determination unit 41h determines the target engine rotational speed, the target motor rotational speed, and the target drum angle. The target engine rotational speed and the target motor rotational speed are rotational speeds corresponding to the second transmission gear position. More specifically, the target engine rotational speed and the target motor rotational speed are the engine rotational speed and the motor rotational speed for synchronous control for bringing one of the rotational speed of the dog 24 at the second transmission gear position and the rotational speed of the transmission gear at the second transmission gear position close to the other.

Here, "synchronous control for bringing one of the rotational speed of the dog 24 at the second transmission gear position and the rotational speed of the transmission gear at the second transmission gear position close to the other" is control in which an input side of the dog 24 and the second gear 23b2 is matched with an output side. For example, when the dog 24 that rotates integrally with the input shaft 21 is engaged with the second gear 23b2 that is externally mounted on the input shaft 21, the synchronous control means control of bringing the rotational speed of the dog 24 close to the rotational speed of the second gear 23b2. In addition, for example, when the dog 24 that rotates integrally with the output shaft 22 is engaged with the second gear 23b2 that is externally mounted on the output shaft 22, the synchronous control means control of bringing the rotational speed of the second gear 23b2 close to the rotational speed of the dog 24. By performing the synchronous control before the dog 24 enters the accommodation space S of the second gear 23b2, the dog 24 is smoothly engaged with the second gear 23b2.

In the present embodiment, in step S5, the shift control unit 41e first determines the first transmission gear position, which is the current transmission gear position of the gear transmission 20, from the detected angle signal of the gear position sensor 31. In addition, the shift control unit 41e determines the second transmission gear position, which is the next transmission gear position, in accordance with whether the shift command is a shift-up command or a shift-down command. The target determination unit 41h calculates the target engine rotational speed and the target motor rotational speed from the reduction ratio at the second transmission gear position and the current rotational speed of the output shaft 22 such that one of the rotational speed of the dog 24 and the rotational speed of the second gear 23b2 at the second transmission gear position is matched with the other. In the HEV mode, the rotational speed of the input shaft 21 corresponding to the target engine rotational speed and the rotational speed of the input shaft 21 corresponding to the target motor rotational speed have the same value.

(Determination on Timing)

After step S5, the timing determination unit 41i determines the timing at which the synchronous control is started and the timing at which the control for moving the dog 24 is started (step S6).

The timing determination unit 41i determines the start timing of the synchronous control such that the start timing of the synchronous control is after the execution of the separation control and before the dog 24 at the first transmission gear position moves out of the accommodation space S at the first transmission gear position.

Here, the start timing of the synchronous control is a timing at which when a plurality of prime movers that transmit the driving force to the input shaft 21 exist, the synchronous control is first started among the plurality of prime movers. For example, in the HEV mode, when the synchronous control of the engine 12 is started before the synchronous control of the drive motor 13, the timing determination unit 41i determines the start timing of the synchronous control of the engine 12 such that the start timing of the synchronous control of the engine 12 is after the execution of the separation control and before the dog 24 at the first transmission gear position moves out of the accommodation space S at the first transmission gear position.

In the present embodiment, the synchronous control is started in accordance with the angular position θ of the dog 24 estimated by the position estimation unit 41g. Specifically, the start timing of the synchronous control is determined such that the synchronous control is started when it is determined that the angular position θ of the dog 24 estimated by the position estimation unit 41g reaches a predetermined position separated from the abutment surface.

After the execution of the separation control is started, the timing determination unit 41*i* determines the start timing of the synchronous control such that the synchronous control is started when it is determined that the angular position θ of the dog 24 at the first transmission gear position estimated by the position estimation unit 41*g* reaches an angular position where the dog 24 abuts against the opposite surface, which is a side that is not the abutment surface, of the first surface 25*a* and the second surface 25*b*.

In addition, the timing determination unit 41*i* determines a timing at which movement control for separating the dog 24 at the first transmission gear position from the first gear 23*b*1 and moving the dog 24 at the second transmission gear position toward the second gear 23*b*2 is started. The timing at which the movement control on the dog 24 is started may be determined based on the estimated angular position θ of the dog 24. Alternatively, the timing at which the movement control on the dog 24 is started may be determined based on the determined start timing of the synchronous control. That is, the start timing of the movement control on the dog 24 may be determined after the start timing of the synchronous control is determined first.

When the start timing of the synchronous control and the start timing of the movement control on the dog 24 are determined in step S6, the synchronous control (step S7) and the control of the shift actuator 30 (step S8) are performed according to the determined timings (see FIG. 8).

Specifically, in the EGV mode or the HEV mode, the engine control unit 41*b* controls the engine 12 to start the synchronous control at the timing determined in step S6. The engine control unit 41*b* feedback controls the engine 12, that is, the throttle device 12*c*, the ignition device 12*d*, and the fuel supply device 12*e* such that the rotational speed of the engine 12 is brought close to the target engine rotational speed R1 determined in step S5.

In addition, in the EV mode or the HEV mode, the motor control unit 41*c* controls the drive motor 13 to start the synchronous control at the timing determined in step S6. The motor control unit 41*c* feedback controls the drive motor 13 such that the rotational speed of the drive motor 13 is brought close to the target motor rotational speed R2 determined in step S5.

In addition, the shift control unit 41*e* controls the shift actuator 30 so as to start control for moving the dog 24 at the timing determined in step S6.

In the present embodiment, the same control parameters are used for the synchronous control executed after the separation control in step S4 and the synchronous control executed after the separation control in step S4 is omitted. For example, in step S3, when the situation determination unit 41*f* determines that the situation when the shift command is acquired is the situation (b), at least one of the engine control unit 41*b* and the motor control unit 41*c* adjusts the output such that the dog 24 is separated from the second surface 25*b* in the accommodation space S at the first transmission gear position in a direction indicated by the arrow in FIG. 7. Further, when the angular position θ of the dog 24 at the first transmission gear position reaches an angular position (θ=20° in the present example) at which the dog 24 abuts against the first surface 25*a*, which is the opposite surface, at least one of the engine control unit 41*b* and the motor control unit 41*c* starts the synchronous control.

Here, after the situation (b), a situation in which the dog 24 is separated from the second surface 25*b* by the separation control and is allowed to abut against the first surface 25*a* is the same as the situation (c) which is the second situation. Therefore, by allowing the dog 24 to abut against the first surface 25*a* after the situation (b), the synchronous control can be executed using the same control parameter as the control parameter used in the synchronous control in the situation (c).

Similarly, a situation in which the dog 24 is separated from the first surface 25*a* by the separation control and is allowed to abut against the second surface 25*b* after the situation (a) is the same as the situation (d). Therefore, by allowing the dog 24 to abut against the second surface 25*b* after the situation (a), the synchronous control can be executed using the same control parameter as the control parameter used in the synchronous control in the situation (d).

The control parameter of the engine includes, for example, at least one of an ignition cutting timing, duration of the ignition cutting, an ignition retard amount, a fuel injection amount, and a fuel injection timing. The control parameter of the drive motor 13 includes, for example, at least one of a current, a voltage, a command duty (Duty), a forward/reverse rotation command, the torque command value, and a rotational speed command value.

The shift control unit 41*e* determines whether the shift operation corresponding to the shift command is completed (step S9). Specifically, the shift control unit 41*e* determines whether the dog 24 is engaged with the second gear 23*b*2. For example, the shift control unit 41*e* determines whether the drum angle detected by the gear position sensor 31 is the target drum angle determined in step S5.

When the shift control unit 41*e* does not determine that the shift operation corresponding to the shift command is completed (step S9: No), the synchronous control, that is, the feedback control on the rotational speed is continued. In addition, when the shift control unit 41*e* determines that the shift operation corresponding to the shift command is completed (step S9: Yes; see FIG. 9), the processing returns to the torque control in step S1.

As described above, when it is determined that the situation when the shift command is acquired is the first situation, the transmission control device 40 according to the present embodiment first starts the separation control for adjusting the output of the prime mover in a direction in which the dog 24 separates from the abutment surface at the first transmission gear position, and starts the synchronous control after the start of the separation control and before the dog 24 moves out of the accommodation space S at the first transmission gear position.

In the first situation, even when the synchronous control is started without the separation control, the dog 24 abuts against the abutment surface, such that the synchronous control is inhibited, but in the present embodiment, since the dog 24 is separated from the abutment surface at the first transmission gear position by the separation control, the synchronous control can be started before the dog 24 moves out of the accommodation space S at the first transmission gear position (see the arrow in the accommodation space S in FIG. 8). In addition, it is easy to secure the time for the synchronous control as compared with a case where the synchronous control is started after the dog 24 moves out of the accommodation space S at the first transmission gear position.

In addition, in the present embodiment, when it is determined that the situation when the shift command is acquired is the second situation, the separation control is omitted and the synchronous control is started. Therefore, as compared with a case where the synchronous control is started after the dog 24 moves out of the accommodation space S at the first transmission gear position or a case where the synchronous control is started through the separation control, it is easy to secure the time for the synchronous control.

When the synchronous control is started in a state in which the dog 24 is not sufficiently separated from the abutment surface, there is a high possibility that the dog 24 collides with the abutment surface at the first transmission gear position. In the present embodiment, since the synchronous control is started after it is determined that the abutment surface and the dog 24 are separated from each other, the synchronous control can be effectively started.

In addition, in the present embodiment, since the synchronous control is started when it is determined that the angular position θ of the dog 24 reaches the position where the dog 24 abuts against the opposite surface, the synchronous control can be started in a state in which the dog 24 and the abutment surface are sufficiently separated from each other, and the time for the synchronous control can be more easily secured.

In addition, in the present embodiment, since the synchronous control is executed using the same control parameter in the first situation and the second situation, the adjustment operation on the control parameter is facilitated.

In addition, in the present embodiment, the angular position of the dog 24 is calculated using the output torque of the prime mover and the total value of the inertia of the rotary bodies that are substantially rotated by the output torque, whereby the calculation accuracy of the angular position of the dog 24 can be improved.

In addition, in the present embodiment, the angular position θ of the dog 24 estimated by the position estimation unit 41g is used for both the situation determination in step S3 and a trigger for starting the synchronous control in step S7. In this way, since the estimated angular position of the dog 24 is used not only to determine the start timing of the synchronous control, but also to determine whether the dog 24 abuts against the first surface or the second surface at the first transmission gear position, the transmission processing can be simplified.

Other Embodiments

The present disclosure is not limited to the embodiment described above, and the configuration thereof can be changed, added, or deleted.

For example, in the above embodiment, the dogs 24 are integrated with the co-rotation gears 23a, but the dogs 24 may be separate from the co-rotation gears 23a. For example, instead of making the co-rotation gear 23a slidable with respect to the input shaft 21 or the output shaft 22, a dog ring including the dog 24 may be provided so as to be slidable with respect to the input shaft 21 or the output shaft 22. In addition, the dogs may not be disposed around both the input shaft 21 and the output shaft 22, and the dogs at all the transmission gear positions may be disposed around only one of the input shaft 21 and the output shaft 22.

In FIGS. 3, 4, 7, 8, and 9, the transmission gear 23 provided with both the dog (the first dog) 24 at the first transmission gear position which is the current transmission gear position and the dog (the second dog) 24 at the second transmission gear position which is the next speed change stage is shown, but the gear transmission may not include such a transmission gear. That is, the dog 24 at the first transmission gear position and the dog 24 at the second transmission gear position which is the next transmission gear position may be provided in separate transmission gears 23, or may be provided in separate dog rings.

In the above embodiment, the angular position of the dog 24 is estimated based on the torque command value for the prime mover and the inertia of the prime mover, but the present disclosure is not limited to the method for estimating the angular position of the dog. For example, the position estimation unit may calculate the angular position of the dog 24 based on the rotational speed of the input shaft 21 or a parameter corresponding thereto and the rotational speed of the output shaft 22 or a parameter corresponding thereto. Examples of the rotational speed of the input shaft 21 or a parameter corresponding thereto include the engine rotational speed sensor and the motor rotational speed sensor. In addition, examples of the rotational speed of the output shaft 22 or a parameter corresponding thereto include a rotational speed sensor that directly detects the rotational speed of the output shaft 22 and a wheel rotational speed sensor that detects the rotational speed of the rear wheel 3 which is a drive wheel. According to this configuration, the provided sensor can be used to estimate the dog position.

In the above embodiment, the angular position of the dog 24 is calculated based on the torque command value for the prime mover and the inertia of the prime mover, but the method for estimating the angular position of the dog is not limited thereto. For example, the angular position of the dog may be calculated based on the rotational speed of the input shaft or a parameter corresponding thereto and the rotational speed of the output shaft or a parameter corresponding thereto.

The shift command may be transmitted from another device instead of the shift switch. In addition, the transmission control device may automatically generate the shift command. For example, the transmission control device may store a transmission map which defines a relation between a transmission timing and the vehicle speed, the engine rotational speed, and throttle opening, or may automatically generate the shift command based on the transmission map.

In addition, in the above embodiment, an example in which the first prime mover is an internal combustion engine and the second prime mover is an electric motor has been described, but the type of the prime mover that transmits the driving force to the input shaft is not limited thereto. For example, the prime mover may be an internal combustion engine, an external combustion engine, an electric motor, a fluid machine, or the like. The type of the engine is not particularly limited, and for example, may be a reciprocating engine or a rotary engine. For example, the engine may be a gasoline engine or a diesel engine. For example, the engine may be a two-stroke engine or a four-stroke engine. The first prime mover and the second prime mover may be the same type of prime mover.

In addition, the start timing of the synchronous control may be different between the first prime mover and the second prime mover. In addition, in the above embodiment, the vehicle including the transmission control device 40 is a hybrid vehicle including the first prime mover and the second prime mover, but the vehicle may not be a hybrid vehicle. For example, the vehicle may include only one of the engine and the electric motor.

The vehicle is not limited to a motorcycle. For example, the vehicle may be, for example, a motor tricycle or a four-wheeled motor vehicle. In the above embodiment, the transmission control device 40 for the power system of the motorcycle 1 has been described, but the transmission control device can also be applied to a power system of another type of vehicle such as a motor tricycle or a four-wheeled motor vehicle.

In addition, the transmission control device is also applicable to a shift operation in a system other than a power system of a vehicle, such as a machine tool.

The functions of the elements disclosed in the present description can be executed using a circuit or a processing circuit including a general-purpose processor, a dedicated processor, an integrated circuit, application specific integrated circuits (ASIC), a circuit in the related art, or any combination thereof, which are configured or programmed to execute the disclosed functions. The processor includes a transistor and other circuits, and thus is regarded as a processing circuit or a circuit. In the present disclosure, a circuit, a unit, or a means is hardware that executes the listed functions or hardware that is programmed to execute the listed functions. The hardware may be the hardware disclosed in the present description, or may be other known hardware that is programmed or configured to execute the listed functions. In a case of a processor in which the hardware is considered to be a type of circuit, the circuit, the means, or the unit is a combination of hardware and software, and the software is used for the configuration of the hardware or the processor.

A transmission control device according to an aspect of the present disclosure is directed to a transmission control device configured to control a prime mover in a system. The system includes the prime mover and a gear transmission including an input shaft and an output shaft to which a driving force of the prime mover is transmitted, a plurality of dogs which are movable with respect to the input shaft and the output shaft and correspond to a plurality of transmission gear positions, respectively, and a plurality of transmission gears corresponding to the plurality of transmission gear positions, respectively. Each of the transmission gears includes an accommodation space that allows the dog to enter, and a first surface and a second surface which define the accommodation space in a circumferential direction of the transmission gear. The first surface is a surface against which the dog abuts when torque is transmitted to the output shaft in a positive direction, and the second surface being a surface against which the dog abuts when torque is transmitted to the output shaft in a negative direction opposite to the positive direction. The transmission control device comprises a processing circuit. The processing circuit is configured to determine whether a situation in which a shift command for shifting from a first transmission gear position to a second transmission gear position is acquired is a first situation, which is a situation in which the shift command is a shift-down command and the dog abuts against the first surface at the first transmission gear position or a situation in which the shift command is a shift-up command and the dog abuts against the second surface at the first transmission gear position, when it is determined that the situation is the first situation, start separation control for adjusting an output of the prime mover such that the dog is separated from an abutment surface which is the first surface or the second surface against which the dog abuts when the shift command is acquired, and after execution of the separation control and before the dog at the first transmission gear position moves out of the accommodation space at the first transmission gear position, start synchronous control for bringing one of a rotational speed of the dog at the second transmission gear position and a rotational speed of the transmission gear at the second transmission gear position close to the other.

According to the above configuration, when it is determined that the situation when the shift command for shifting from the first transmission gear position to the second transmission gear position is acquired is the first situation in which the shift command is a shift-down command and the dog abuts against the first surface at the first transmission gear position, or the shift command is a shift-up command and the dog abuts against the second surface at the first transmission gear position, the transmission control device first starts the separation control for adjusting the output of the prime mover in the direction in which the dog is separated from the abutment surface at the first transmission gear position, and starts the synchronous control after the start of the separation control and before the dog moves out of the accommodation space at the first transmission gear position.

In the first situation, even when the synchronous control is started without the separation control, the dog abuts against the abutment surface, such that the synchronous control is inhibited. In contrast, according to the above configuration, since the dog is separated from the abutment surface at the first transmission gear position by the separation control, it is possible to start the synchronous control before the dog moves out of the accommodation space at the first transmission gear position. In addition, it is easy to secure the time for the synchronous control as compared with a case where the synchronous control is started after the dog moves out of the accommodation space at the first transmission gear position.

When it is determined that the situation is a second situation different from the first situation, the processing circuit may omit the separation control and start the synchronous control. According to this configuration, since the transmission control device omits the separation control and starts the synchronous control in a situation other than the first situation, it is easy to secure the time for the synchronous control as compared with a case where the synchronous control is started after the dog moves out of the accommodation space at the first transmission gear position or a case where the synchronous control is started through the separation control.

The processing circuit may estimate an angular position of the dog with respect to the accommodation space at the first transmission gear position in a rotation direction of the dog during adjustment on the output of the prime mover, and may start the synchronous control when it is determined that the estimated angular position of the dog reaches a predetermined position separated from the abutment surface. When the synchronous control is started in a state in which the dog is not separated from the abutment surface, there is a high possibility that the dog collides with the abutment surface at the first transmission gear position. According to the above configuration, since the synchronous control is started after it is determined that the abutment surface and the dog are separated from each other, the synchronous control can be effectively started.

The processing circuit may start the synchronous control when it is determined that the estimated angular position of the dog reaches a position where the dog abuts against an opposite surface, which is a side that is not the abutment surface, of the first surface and the second surface after the separation control is started. According to this configuration, the synchronous control can be started in a state in which the dog and the abutment surface are sufficiently separated from each other, and the time for the synchronous control can be further easily secured.

A control parameter used for the synchronous control executed after the separation control may be the same as a control parameter used for the synchronous control executed when it is determined that the situation is the second situation. According to this configuration, since the synchronous control can be executed using the same control parameter in the first situation and the second situation, the adjustment operation on the control parameter is facilitated.

The processing circuit may calculate the angular position of the dog based on output torque of the prime mover and a total value of inertia of a plurality of rotary bodies rotated by the output torque of the prime mover, and the plurality of rotary bodies may include an output shaft of the prime mover, the input shaft, and the rotary bodies rotated together with the input shaft even when among the plurality of transmission gears and the plurality of dogs in the gear transmission, none of the plurality of dogs is engaged with the corresponding transmission gear. The calculation accuracy of the angular position of the dog can be improved by calculating the angular position of the dog using the output torque of the prime mover and the total value of the inertia of the rotary bodies that are substantially rotated by the output torque.

The processing circuit may calculate the angular position of the dog based on a rotational speed of the input shaft or a parameter corresponding thereto and a rotational speed of the output shaft or a parameter corresponding thereto. According to this configuration, the provided sensor can be used to estimate the dog position.

When it is determined that the situation is the first situation, the processing circuit may estimate the angular position of the dog with respect to the accommodation space at the first transmission gear position, and determine whether the dog abuts against the first surface or the second surface at the first transmission gear position in accordance with the estimated angular position of the dog. According to this configuration, the estimated angular position of the dog is used not only to determine the start timing of the synchronous control, but also to determine whether the dog abuts against the first surface or the second surface at the first transmission gear position. Therefore, the processing executed by the processing circuit can be simplified.

A transmission control method according to an aspect of the present disclosure is directed to a transmission control method for controlling a prime mover in a system. The system includes the prime mover and a gear transmission including an input shaft and an output shaft to which a driving force of the prime mover is transmitted, a plurality of dogs which are movable with respect to the input shaft and the output shaft and correspond to a plurality of transmission gear positions, respectively, and a plurality of transmission gears corresponding to the plurality of transmission gear positions, respectively. Each of the transmission gears includes an accommodation space that allows the dog to enter, and a first surface and a second surface which define the accommodation space in a circumferential direction of the transmission gear. The first surface being a surface against which the dog abuts when torque is transmitted to the output shaft in a positive direction, and the second surface being a surface against which the dog abuts when torque is transmitted to the output shaft in a negative direction opposite to the positive direction. The transmission control method comprises determining whether a situation in which a shift command for shifting from a first transmission gear position to a second transmission gear position is acquired is a first situation, which is a situation in which the shift command is a shift-down command and the dog abuts against the first surface at the first transmission gear position or a situation in which the shift command is a shift-up command and the dog abuts against the second surface at the first transmission gear position, when it is determined that the situation is the first situation, starting separation control for adjusting an output of the prime mover such that the dog is separated from an abutment surface that is the first surface or the second surface against which the dog abuts when the shift command is acquired, and after execution of the separation control and before the dog at the first transmission gear position moves out of the accommodation space at the first transmission gear position, starting synchronous control for bringing one of a rotational speed of the dog at the second transmission gear position and a rotational speed of the transmission gear at the second transmission gear position close to the other.

In the first situation, even when the synchronous control is started without the separation control, the dog abuts against the abutment surface, such that the synchronous control is inhibited. In contrast, according to the above method, since the dog and the abutment surface at the first transmission gear position are separated from each other by the separation control, it is possible to start the synchronous control before the dog moves out of the accommodation space at the first transmission gear position. In addition, it is easy to secure the time for the synchronous control as compared with a case where the synchronous control is started after the dog moves out of the accommodation space at the first transmission gear position.

What is claimed is:

1. A transmission control device configured to control a prime mover in a system including the prime mover and a gear transmission, the transmission control device comprising:
   a processing circuitry, wherein
   the gear transmission includes an input shaft to which a driving force of the prime mover is transmitted, an output shaft, a plurality of dogs movable to the input shaft and the output shaft and each corresponding to a plurality of transmission gear positions, and a plurality of transmission gears each corresponding to the plurality of transmission gear positions and including an accommodation space into which the dog is capable of entering,
   the transmission gears include a first surface and a second surface by which the accommodation space is defined in a circumferential direction of the transmission gears, the first surface being a surface against which the dog abuts when torque is transmitted to the output shaft in a positive direction, and the second surface being a surface against which the dog abuts when torque is transmitted to the output shaft in a negative direction opposite to the positive direction,
   the transmission control device causes the processing circuitry to execute a process, the process including:
      determining whether to fall into a first situation at a time of acquiring a shift command for shifting from a first transmission gear position to a second transmission gear position, the first situation being a situation where the shift command is a shift-down command and the dog abuts against the first surface at the first transmission gear position or a situation where the shift command is a shift-up command and the dog abuts against the second surface at the first transmission gear position;
      when the processing circuitry is determined as being the first situation, starting a separation control that adjusts an output of the prime mover such that the dog is separated from an abutment surface against which the dog abuts at the time of acquiring the shift command, the abutment surface being the first surface or the second surface; and after the separation control is completed and before the dog at the first transmission gear position moves out of the accommodation space at the first transmission gear position, starting a synchronous control that brings one of a rotational speed of the dog at the second transmission gear position and a rotational speed of the transmission gears at the second transmission gear position close to the other.

2. The transmission control device according to claim 1, wherein
the transmission control device causes the processing circuitry to execute the process, the process further including:
when the processing circuitry is determined as being a second situation different from the first situation, omitting the separation control to start the synchronous control.

3. The transmission control device according to claim 1, wherein
the transmission control device causes the processing circuitry to execute the process, the process further including:
estimating an angular position of the dog with respect to the accommodation space at the first transmission gear position in a rotation direction of the dog while adjusting the output of the prime mover; and
starting the synchronous control when the processing circuitry is determined that the estimated angular position of the dog reaches a predetermined position separated from the abutment surface.

4. The transmission control device according to claim 3, wherein
the transmission control device causes the processing circuitry to execute the process, the process further including:
after the separation control is started, starting the synchronous control when the processing circuitry is determined that the estimated angular position of the dog reaches a position where the dog abuts against a surface opposite to the abutment surface among the first surface and the second surface.

5. The transmission control device according to claim 2, wherein
a control parameter used for the synchronous control executed after the separation control is the same as a control parameter used for the synchronous control executed when the processing circuitry is determined as being the second situation.

6. The transmission control device according to claim 3, wherein
the transmission control device causes the processing circuitry to execute the process, the process further including:
calculating the angular position of the dog based on output torque of the prime mover and a total value of inertia of a plurality of rotary bodies rotated by the output torque of the prime mover, and
the plurality of rotary bodies include:
an output shaft of the prime mover;
the input shaft; and
another rotary body rotated together with the input shaft.

7. The transmission control device according to claim 6, wherein
the another rotary body is configured to rotate together with the input shaft even when the plurality of dogs is in a non-engagement with the corresponding transmission gear among the plurality of transmission gears and the plurality of dogs in the gear transmission.

8. The transmission control device according to claim 3, wherein
the transmission control device causes the processing circuitry to execute the process, the process further including:
calculating the angular position of the dog based on a rotational speed of the input shaft or a parameter corresponding to the rotational speed of the input shaft and a rotational speed of the output shaft or a parameter corresponding of the rotational speed of the output shaft.

9. The transmission control device according to claim 3, wherein
the transmission control device causes the processing circuitry to execute the process, the process further including:
when determining whether to fall into the first situation, estimating the angular position of the dog with respect to the accommodation space at the first transmission gear position; and
determining whether the dog abuts against the first surface or the second surface at the first transmission gear position in accordance with the estimated angular position of the dog.

10. A transmission control method for controlling a prime mover in a system including the prime mover and a gear transmission, wherein
the gear transmission includes an input shaft to which a driving force of the prime mover is transmitted, an output shaft, a plurality of dogs movable to the input shaft and the output shaft and each corresponding to a plurality of transmission gear positions, and a plurality of transmission gears each corresponding to the plurality of transmission gear positions and including an accommodation space into which the dog is capable of entering,
the transmission gears include a first surface and a second surface by which the accommodation space is defined in a circumferential direction of the transmission gears, the first surface being a surface against which the dog abuts when torque is transmitted to the output shaft in a positive direction, and the second surface being a surface against which the dog abuts when torque is transmitted to the output shaft in a negative direction opposite to the positive direction, and
the transmission control method comprises:
determining whether to fall into a first situation at a time of acquiring a shift command for shifting from a first transmission gear position to a second transmission gear position, the first situation being a situation where the shift command is a shift-down command and the dog abuts against the first surface at the first transmission gear position or a situation where the shift command is a shift-up command and the dog abuts against the second surface at the first transmission gear position;
when determining that the situation is the first situation, starting a separation control that adjusts an output of the prime mover such that the dog is separated from an abutment surface against which the dog abuts at the time of acquiring the shift command, the abutment surface being the first surface or the second surface; and
after the separation control is completed and before the dog at the first transmission gear position moves out of the accommodation space at the first transmission gear position, starting a synchronous control that brings one of a rotational speed of the dog at the second transmission gear position and a rotational speed of the transmission gears at the second transmission gear position close to the other.

* * * * *